United States Patent Office 3,565,589
Patented Feb. 23, 1971

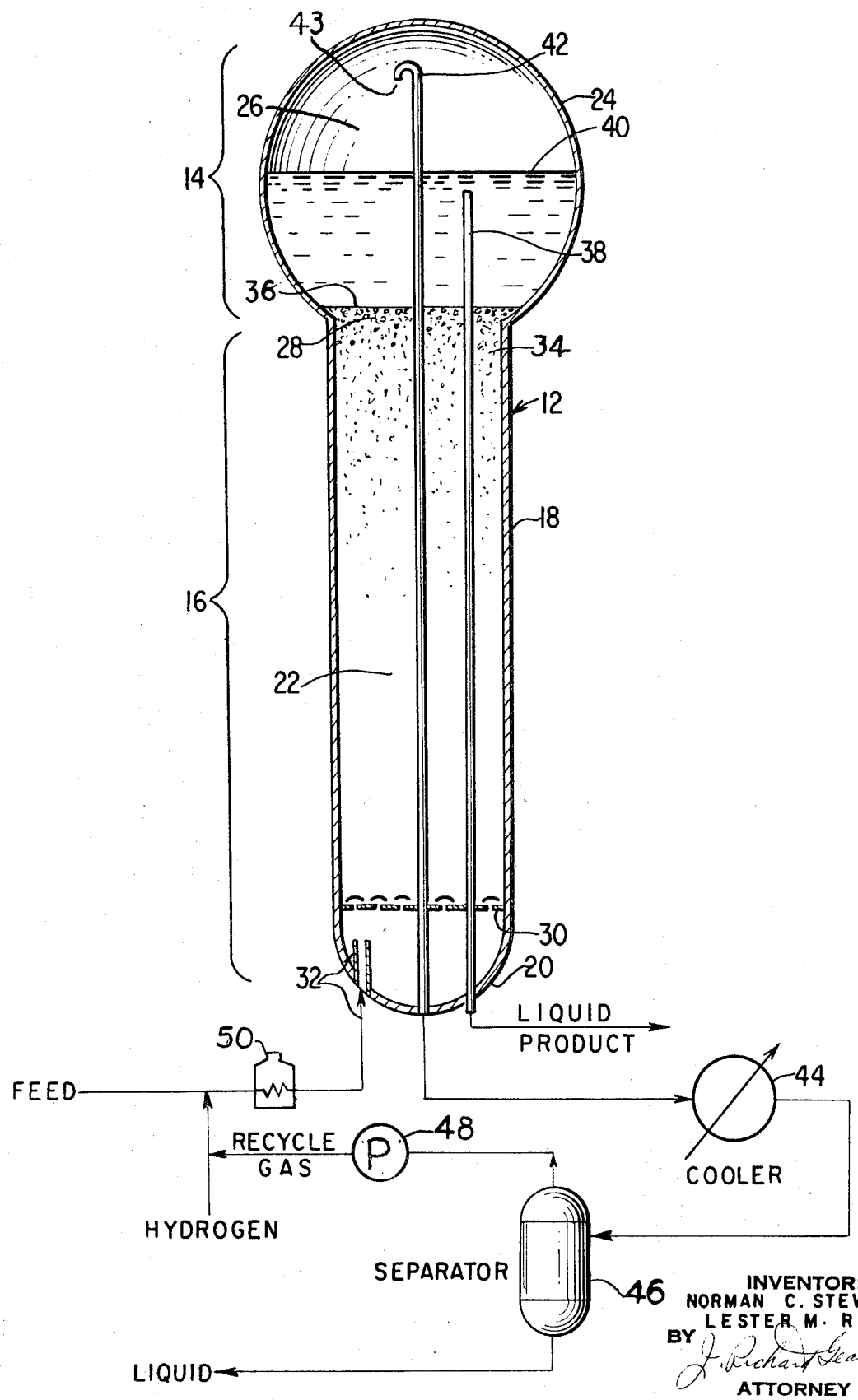

3,565,589
UPFLOW CATALYTIC HYDROTREATING REACTOR
Norman C. Stewart, Kendall Park, and Lester M. Rapp, Highstown, N.J., assignors to Cities Service Research and Development Company, New York, N.Y., a corporation of Delaware
Filed Oct. 28, 1968, Ser. No. 771,228
Int. Cl. B01j 9/12, 9/16, 9/20
U.S. Cl. 23—289                              1 Claim

ABSTRACT OF THE DISCLOSURE

A process for hydrotreating a heavy hydrocarbon oil and a high pressure, high temperature reactor vessel for practicing the process is disclosed herein. The reactor is constructed of a vertically mounted cylindrical shell with a spherical shell attached to the upper end of the cylindrical shell. Preferably a transverse grid is mounted in the lower end of the cylindrical shell with a feed conduit opening into the cylindrical shell below the grid, and liquid withdrawal and gaseous effluent conduits extending into the reactor and opening in the spherical shell respectively below and above the liquid reactant level in the reactor. Apparatus and process are also shown for separating liquid components from the effluent and recycling separated gases, principally hydrogen, to the reactor feed conduit. The process includes treating a hydrocarbon liquid with a hydrogen-containing gas at high pressure and high temperature (i.e., above 658° F. and 1000 p.s.i.g.) in the presence of a finely divided particulate catalyst by passing upwardly in the vessel a mixture of the liquid and gas through the particulate catalyst at a flow velocity sufficient to maintain the catalyst in an expanded state, and subsequently reducing the upward flow velocity of the mixture to below that which the liquid and particulate catalyst material are carried upward by the gas, by increasing the cross-sectional area of the flow.

BACKGROUND OF THE INVENTION

This invention relates to apparatus and process for use in petroleum refining. More particularly this invention relates to a reactor vessel for the high pressure and high temperature hydrotreating of a hydrocarbon fluid in the presence of catalytically active particulate solids.

Catalytic hydrogenation of petroleum oils in order to obtain lower boiling more desirable products has long been practiced. Lately, more attenuation has been directed to the deep hydrogenation of heavy hydrocarbon oils in order to not only obtain the lower boiling saturated hydrocarbon products but also to desulfurize and denitrogenize the oil. It has been found that the use of upflow, fully backmixed type reactors utilizing either an expanded bed type process or a catalyst bed having fine catalyst particles at high pressures above 1000 p.s.i.g. and at high temperatures above 650° F., is particularly attractive.

Generally reactors for use with such upflow catalytic hydrogenation treatment of a heavy hydrocarbon oil have been cylindrically shaped with a uniform cross-section over substantially the whole length of the reactor. A hydrocarbon oil is passed into the bottom of the cylindrical reactor together with large volumes of hydrogen and possibly a small proportion of a particulate catalyst and the mixture caused to flow generally in an upward direction, either expanding the particulate catalyst bed as in the process described in U.S. Pat. No. Re. 25,770 issued Apr. 27, 1965 to E. S. Johanson for a Gas-liquid Contacting Process, or suspending finer type of particulate catalist in the liquid phase of the reactant, while liquid and/or gaseous product together with gaseous effluents are removed through conduits at the top of the reactor. In the above processes the catalyst bed is expanded by the overall upflow velocity of the fluids in the cylinder so that the bed generally expands to occupy almost the same volume as occupied by the liquid phase of the reactants.

While operating the above process and utilizing fine particulate catalyst in the range of from about 40 microns to about 400 microns it has been found necessary to provide for retention of catalyst particles and for efficient gas-liquid separation in the reactor. That is, within the operational parameters of upward fluid velocities, particularly at the solids-liquid and gas-liquid separation levels, there is a necessity of: (1) retaining the fine particulate catalyst in the liquid phase; (2) preventing particles from being carried out of the reactor with the liquid effluent; (3) preventing liquid entrainment in the gaseous effluent; and, (4) gaseous entrainment in the liquid phase. One solution is to maintain a large enough disengaging height between thet liquid and catalyst level in the reactor, and between the liquid level and the gaseous effluent drawoff conduit. The disadvantage of such a solution is the loss of reactor volume necessitated by the greater disenagement heights. High pressure, high temperature reactors are extremely expensive items of capital equipment and of necessity it is desirable to obtain a reactor which will process as large as possible a quantity of oil for a specific reactor volume.

SUMMARY OF THE INVENTION

Accordingly we have invented a novel improved reactor vessel comprising a vertically mounted cylindrical shell forming a cylindrically shaped chamber, with a spherical shell mounted on top of the cylindrical shell and forming a spherical chamber communicatingly connected to the top of the cylindrical chamber. Liquid and vapor drawoff conduits are connected to the reactor and open into the spherical chamber respectively below and above the upper level of the liquid phase. Preferably, a grid is transversely mounted in the lower portion of the cylindrical chamber, and a feedline is communicatingly connected to the vessel below the grid.

The vessel is particularly adaptable to a process which contemplates treating a hydrocarbon liquid with a hydrogen-containing gas at high pressure and high temperature (i.e., above 650° F. and 1000 p.s.i.g.) in the presence of a finely divided particulate catalyst by passing upwardly in the vessel a mixture of the liquid and gas through the particulate catalyst at a flow velocity sufficient to maintain the catalyst in an expanded state, and subsequently reducing in the upper portion of the vessel the upward flow velocity of the mixture to a flow velocity below which the liquid and particulate catalyst material is carried upward by the gas.

It is therefore an object of this invention to provide a novel and improved high pressure and temperature reactor vessel.

Another object of this vessel is to provide an apparatus for treating heavy hydrocarbon oils with hydrogen at high pressure and temperature.

Yet another object of this invention is to provide an apparatus for reducing the relative amount of gas-liquid disengagement volume required for an upflow reactor vessel.

Still another and more important object of this invention is to provide an apparatus for reducing the relative amount of catalyst required for an upflow reactor vessel when finely divided catalyst particles are used.

Other objects and advantages will be apparent from the drawings and description of the preferred embodiment which follow.

BRIEF DESCRIPTION OF THE DRAWING

The drawing shows an elevational view of the reactor vessel of the invention and the process associated therewith.

BRIEF DESCRIPTION OF THE PREFERRED EMBODIMENT

With reference to the drawing, a high pressure, high temperature reactor vessel 12 is shown. The vessel 12 is constructed either from steel plates, or rings and is able to withstand safely pressures of up to about 10,000 p.s.i. at temperatures of up to 1,500° F. The vessel 12 is constructed of two different structurally shaped portions, an upper spherical portion 14 and a lower cylindrical portion 16. The lower portion 16 is formed from a vertical cylindrical shell 18 having a hemispherically shaped wall 20 at the bottom and enclosing and forming a cylindrical chamber 22. A spherical shell 24 having a spherical chamber 26 whose diameter is larger than the cross-sectional diameter of the cylindrical shell 18 is connected to the top of the cylindrical shell and constitutes the upper portion 14 of the vessel 12. The spherical shell 24 has a large opening 28 in its wall adjacent the top of the cylindrical shell. The opening 28 is bounded by the top edge of the cylindrical shell where the cylindrical shell and the spherical shell are attached to each other utilizing methods to obtain a high strength, pressure sealed connection whereby the spherical chamber 26 is effectively communicatingly connected with the upper portion of the cylindrical chamber 22.

A transversely mounted grid 30 is fixedly mounted to the internal walls of the cylindrical shell 18. The grid 30 is preferably located in the lower part of the cylindrical chamber just above the hemispherical bottom wall 20 and is of a conventional construction such as a bubble cap tray. The purpose of the grid 30 is to uniformly distribute fluid passing therethrough over the whole cross-sectional area covered by the grid. Additionally, the grid may be designed to prevent reverse flow of solid or liquid materials into the portion of the vessel below the grid. Finally, while only one transverse grid is described and shown herein, it should be understood that a number of grids of the same or different types may be sequentially vertically stacked within the vessel for distribution or other purposes.

A feed conduit 32 is connected to the lower portion of the vessel 12 below the grid 30. Heavy hydrocarbon oil feed, hydrogen gas, and fresh fine particulate catalyst are passed via the feed conduit 32 into the vessel 12. The heavy hydrocarbon oil is preferably but not necessarily an oil boiling above 650° F. and may include heavy gas-oil, cycle oil, crude oil, synthetic crude oil, residuum or other relatively high boiling petroleum oil for which hydrotreating is a preferred treatment. The advantages obtained from hydrotreating the above oils include for instance hydrogenation, reduction of olefine content, thermal cracking and saturation of aromatics, desulfurization and denitrogenation.

The hydrogen which is supplied via the feed conduit is usually in the form of a gaseous stream containing other constituents such as carbon oxides, nitrogen, methane, ethane and steam, and may be in any desired amount and at any desired partial pressure.

The hydrogen gas is generally supplied at a rate of from about 250 to about 50,000 standard cubic feet of hydrogen per barrel of feedstock, and at a partial pressure of from about 500 p.s.i.g. to about 5,000 p.s.i.g. Preferably, the hydrogen gas, which may be a recycle gas obtained from a source hereinafter described, is in the form of a hydrogen-containing recycle gas in the amount of from 500 to 10,000 s.c.f. of hydrogen per barrel of feed at a pressure of between about 1,500 p.s.i.g. and about 3,000 p.s.i.g.

Additionally, fresh particulate catalyst is supplied via the feed conduit 32 to the reactor vessel 12. The fresh particulate catalyst may be supplied either continually, or intermittently as desired, to maintain the amount of catalyst in the reactor at a suitably constant activity and concentration level. The catalyst supplied to and maintained in the reactor vessel forms an expanded catalyst bed 34 in the vessel, with an upper catalyst level 36 in the vessel. The level 36 may be raised or lowered as desired to allow for withdrawal of the catalyst along with liquid hydrocarbon products but during operation is ordinarily maintained in the reactor adjacent the top of the cylindrical chamber. Spent catalyst may be withdrawn earlier through a liquid drawoff conduit 38, or if desired by other means such as separate catalyst withdrawal conduit, not shown.

Catalyst suitable for use in the reactor vessel of this invention is any form of finely divided particulate catalyst having particle sizes smaller than 500 microns, a particle size of between 40 and about 400 microns being particularly preferred. Such particulate catalysts for use in catalyzing liquid and gaseous reactions are well known in the art and are referred to as heterogenous catalysts to indicate that they are utilized in a different state, i.e. solid, than the (catalyzed) reactants, i.e. fluids. Examples of suitable catalysts for use in treating hydrocarbon oils, are clays, alumina, silica, platinum, silica-alumina, molecular sieves, and zeolites. Those catalysts suitable for hydrotreating hydrocarbon oil such as described herein are preferably those composed of a silica-alumina base impregnaated with one or more transition metals such as nickel, cobalt, manganese, iron, vanadium, etc., their oxides or sulfides.

The feed, consisting essentially of a heavy hydrocarbon feedstock, a hydrogen containing gas and possibly finely divided particulate catalyst is passed into the reactor via the feed conduit 32 at a rate sufficient to establish and maintain an upward superficial gas velocity in the cylindrical lower portion of the reactor vessel of not less than 0.20 ft./sec., with a superficial gas velocity of from 0.20 to 0.5 ft./sec. being particularly preferred. Liquid feed is passed into the reactor to maintain a specified liquid flow rate of from 4 to 10 gallons per min. per sq. ft. of cross-section, with a flow rate of about 7 gal./min. per sq. ft. being preferred.

The quantity of finely divided particulate catalyst, the density of the catalyst, and the velocity of the upwardly flowing fluids all combine to establish the catalyst bed level 36, and a gas-liquid interface 40. A gaseous effluent drawoff conduit 42 for removing vapor effluent from the vessel extends into the spherical chamber 26 and has an opening 43 located above the gas-liquid interface 40.

It is necessary that the top of the expanded catalyst level 36 be maintained adjacent to or below the top of the cylindrical chamber to prevent catalyst from inadvertently being carried out of the reactor along with the liquid. However, when it is desired to remove spent catalyst, the bed level may be raised to allow the particulate catalyst to pass out along with the liquid phase products. Alternatively, a separate catalyst withdrawal conduit (not shown) may be utilized.

The gas-liquid interface is established in the spherical shell 24 above the expanded catalyst bed level 36. Preferably the gas-liquid interface 40 is established at a level adjacent the midpoint of the spherical shell so that the superficial velocity of fluids, particularly gases, is reduced to a minimum at the interface 40. In fact, viewed theoretically, the ratio of the smaller to the larger area is the square of their respective diameters, and therefore, the velocity across the respective cross-sectional areas would be the inverse ratio of the square of their respective diameters.

As described hereinbefore, the diameter of the spherical chamber is larger than the cross-sectional diameter of the cylindrical chamber. Preferably the cross-sectional diameter of the cylindrical chamber 22 is from about 1/4 to 14/16 of the diameter of the spherical chamber 26. The diameter of the spherical chamber is necessarily larger in order to reduce the upward flow velocity of the fluid in the reactor to a minimum at the gas-liquid level midway in the spherical chamber. The consequent reduction in the upward flow velocity of the fluid measurably decreases the amount of liquid particles which will be trapped by the upward flowing gases in the volume above the gas-liquid interface 40 in the vessel. The reduction in upward velocity of the fluid decreases the amount of catalyst particles which will be entrained in the upward flow and leave with the liquid product. This will therefore reduce both the height above the gas-liquid interface and the height above the catalyst-liquid interface necessary for disengagement of solids and liquids from the gas and from the liquid.

For instance, a ¼ to 1 ratio of the diameter of the cylindrical chamber to the spherical chamber will reduce the upward velocity of fluid flow at the midpoint of the spherical chamber theoretically to about $\frac{1}{16}$ of the upward velocity of fluids in the cylindrical chamber. As the force imparted to particles, either liquid or solids, by the upwardly flowing gases is directly effected by the kinetic energy available to the particle, the lower the upward velocity is, the lower the kinetic energy imparting upward force to the particles will be. Since the force is directly a result of the velocity squared, the decrease in disengagement height resulting from an increase in the cross-setional area at the gas-liquid interface and liquid-solid interface is theoretically on the order of the ratio of the interface diameter to the cylindrical shell diameter to the fourth power. Therefore, the height that the gaseous effluent drawoff conduit opening need be located above the gas-liquid interface to provide adequate gas-liquid disengagement is measurably reduced in contrast to a vertical cylindrical vessel.

As shown in the drawing, the gaseous effluent drawoff conduit 42 extends downwardly into the reactor vessel and through the bottom of the cylindrical shell 18 to a cooler 44 where, while maintaining the gaseous effluent at substantially the same high pressure present in the reactor vessel, the effluent stream is cooled to condense relatively high boiling point liquid hydrocarbons. The cooler 44 effectively reduces the temperature of the effluent stream to that point at which hydrocarbon material boiling above a predetermined or desired temperature point is condensed from the gaseous phase to the liquid phase. The cooled gas-liquid stream from the cooler 44 is passed to a gas-liquid separator 46 where the gases are separated from the hydrocarbon liquid. The separated cooled hydrocarbon liquid is withdrawn for further processing, not shown, such as fractionation, and the gas is passed to a compressor 48. The compressor 48 raises the pressure of the recycle gas to that of the fresh feed into the reactor. Finally, the feed and the recycle gas from the compressor is heated in a heater 50 to a high enough temperature to bring the feed temperature up to about 800° F. Make up gas containing hydrogen is introduced into the recycle gas stream preferably before heating the recycle gas and used to bring up the amount of hydrogen gas in the feed to the desired operating level.

In operation a reactor having an internal cylindrical chamber cross-sectional diameter of 7 ft. and a spherical chamber inside diameter of 11 ft. is maintained at a temperature of about 840° F. and a total pressure of about 3000 p.s.i.g., of which the hydrogen partial pressure is about 2250 p.s.i.g. Ten thousand (10,000) barrels per stream day (BPSD) of a vacuum residuum together with 6,000 standard cubic feet of hydrogen per barrel of fresh feed is fed into the reactor via the feed conduit 32. The feed rate establishes a superficial gas velocity of about 0.22 ft. per sec. and a liquid velocity of 10.8 gals./min./sq. ft. of reactor in the cylindrical portion of the reactor vessel.

Due to the configuration of the vessel the resulting superficial gas velocity at the midpoint of the spherical chamber of the vessel is about 0.09 feet per second while the liquid velocity is reduced to 4.4 gallons per minute per square foot of reactor cross-section. The reduction of superficial gas velocity is therefore on the order of a multiple of a little less than two and one half times the original velocity in the cylindrical portion of the reactor or about a 60% reduction. The reduction in liquid velocity is of the same magnitude. As a result of this reduction in liquid and gas velocities, the upper level of the expanded catalyst bed is established slightly above the top of the cylindrical chamber in the vessel, and the gas-liquid-catalyst disengagement height is measurably reduced as a result of the difference in kinetic energy of the gas particles. A superficial gas velocity of less than 0.15 ft./sec. is necessary at the liquid-gas interface in order to provide a practical gas-liquid disengagement height. By using the reactor and method of the present invention a superficial gas velocity of 0.09 ft./sec. is obtained with the consequent advantages, in size and cost of the reactor needed, in minimization of gas-liquid-solid disengagement heights, and in added retention of particulate catalyst in the reactor. This reactor also enables much higher velocities to be used in the cylindrical portion of the vessel. The overall effect is of course seen practically where a minimum number of vessels can be used with a diameter in a practical construction size.

Vapor is withdrawn via the gaseous effluent drawoff conduit 42 at the reactor temperature and pressure and passed to the cooler 44 where the temperature is reduced to about 120° F. at a pressure somewhat below reactor pressure, preferably about 150 p.s.i. below reactor pressure. The cooling of the withdrawn vapor condenses hydrocarbon vapor boiling above 120° F. at the elevated pressure, and the mixed condensate and vapor stream is passed to the vapor-liquid separator 8. About 4800 s.c.f.m. of hydrogen containing recycle gas (per barrel of fresh feed) is obtained from the gas-liquid separator. The recycle gas is pressurized to reactor pressure in the compressor 50, mixed with pressurized make up gas to obtain 6000 s.c.f.m. of hydrogen per barrel of feed, heated to about 800° F. in the heater 50 and passed into the feed conduit.

Having disclosed our invention and wishing to cover those modifications and advantages which would be apparent to those skilled in the art without departing from the spirit and scope of the invention.

We claim:

1. A vessel for treating heavy hydrocarbon oil with hydrogen in the presence of finely divided particulate solids catalyst, with a major proportion of said oil being treated in the liquid phase, said apparatus comprising:
   a vertically mounted cylindrical shell forming a cylindrical chamber therein, said cylindrical chamber having a cross-sectional diameter sufficient to enable upflowing liquid hydrocarbon oil and reactants to maintain said particulate catalyst as an expanded catalyst bed;
   a spherical shell mounted on said cylindrical shell and forming a spherical chamber communicatingly connected to said cylindrical chamber, said cylindrical shell having a cross-sectional diameter of from ¼ to about $\frac{14}{16}$ of the cross-sectional diameter of said spherical shell whereby separate catalyst and liquid levels are established in said spherical chamber as a result of velocity change with consequent fluid-catalyst separation at a lower level in said spherical chamber and liquid-gas separation at an upper level adjacent the middle of said spherical chamber;
   a grid transversely mounted within the cylindrical chamber at the bottom thereof;
   feed means communicatingly connected to the cylindrical chamber below the grid for feeding the hydrocarbon oil, hydrogen gas, and particulate catalyst into the cylindrical chamber;

gas withdrawal means extending into and opening in said spherical chamber above said liquid-gas level for withdrawing gaseous effluent; and liquid withdrawal means extending into and opening in said spherical chamber below said liquid-gas level for withdrawing liquid hydrocarbon oil from the spherical chamber.

References Cited

UNITED STATES PATENTS

| | | |
|---|---|---|
| 2,347,829 | 5/1944 | Karlsson et al. _____ 23—288.3 |
| 2,838,579 | 6/1958 | Conrad et al. _____ 23—284UX |
| 2,856,351 | 10/1958 | Welty, Jr., et al. __ 23—288.35X |
| 2,994,594 | 8/1961 | Haines _____ 23—285 |
| 3,197,288 | 7/1965 | Johanson _____ 23—289 |
| 3,394,076 | 7/1968 | Bunn, Jr., et al. __ 23—288.35X |
| 3,396,204 | 8/1968 | McCarty et al. _____ 23—285X |
| 3,409,408 | 11/1968 | Ballestra _____ 23—283 |
| 3,410,792 | 11/1968 | Van Driesen et al. __ 23—288.3 |
| 3,488,161 | 1/1970 | Herp, Jr. _____ 23—289 |
| 3,498,756 | 3/1970 | Carson _____ 23—289 |

JOSEPH SCOVRONEK, Primary Examiner

U.S. Cl. X.R.

23—283; 208—143; 220—3